(No Model.)

F. T. AIKINS.
DEVICE FOR CHECKING HORSES.

No. 399,961. Patented Mar. 19, 1889.

Witnesses.

Inventor.

UNITED STATES PATENT OFFICE.

FREDERICK T. AIKINS, OF TORONTO, ONTARIO, CANADA.

DEVICE FOR CHECKING HORSES.

SPECIFICATION forming part of Letters Patent No. 399,961, dated March 19, 1889.

Application filed June 23, 1888. Serial No. 277,960. (No model.)

*To all whom it may concern:*

Be it known that I, FREDERICK THEOPHILUS AIKINS, clerk, of the city of Toronto, in the county of York, in the Province of Ontario, Canada, have invented a certain new and Improved Device for Checking or Holding a Horse, of which the following is a specification.

The invention relates to certain improvements in a device by which the motion of the wheels of a vehicle may be utilized for the purpose of checking or holding the horse hitched to the said vehicle.

The object of the invention is to simplify and otherwise arrange the operating parts of the device that they will work with the least possible friction; and it consists, essentially, in the specific construction and arrangement of the parts, as hereinafter more particularly explained.

Figure 1:
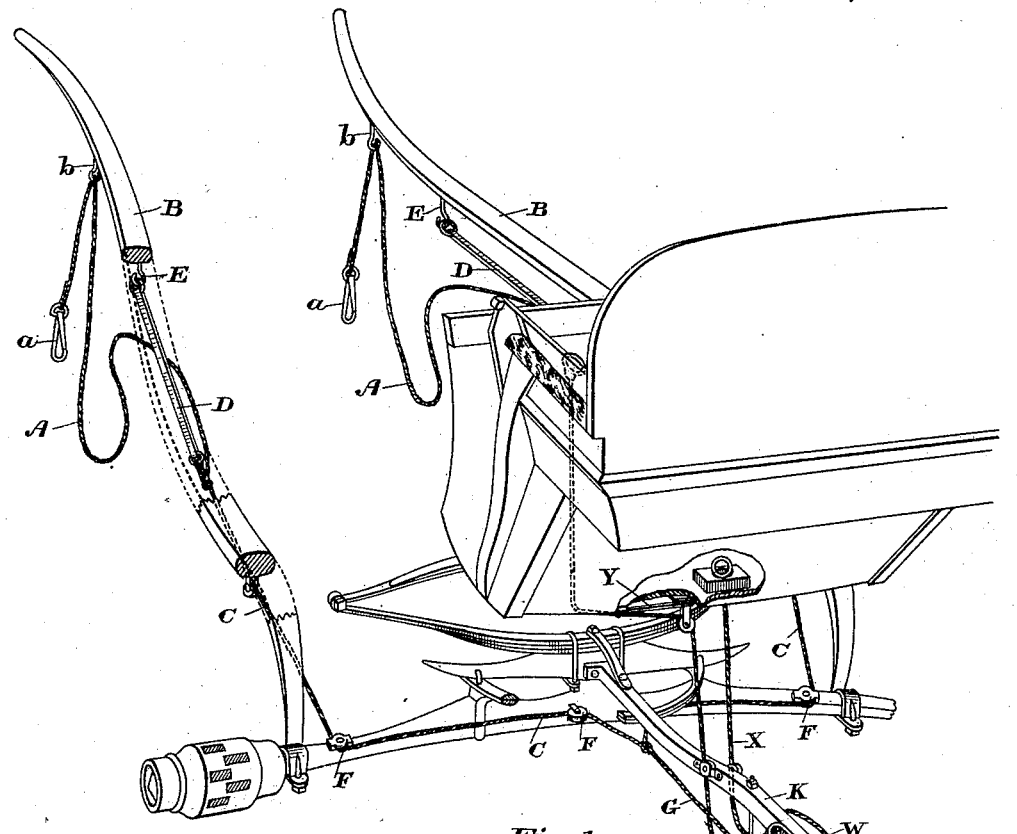
Figures 2, 3, 4:
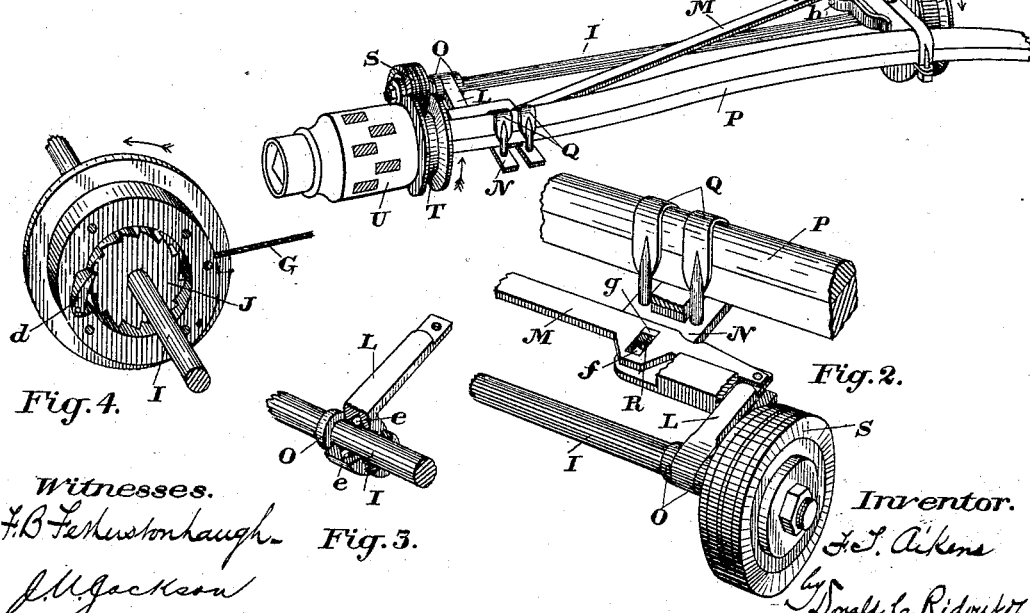

Figure 1 is a perspective view, partially in section, of a vehicle provided with my improved hitching device. Fig. 2 is an enlarged perspective detail of a portion of the adjustable shaft and its operating-lever. Fig. 3 is a detail of the adjustable shaft and its bearing in section. Fig. 4 is an end view of the winding-drum, showing its connection with the shaft.

In the drawings, A represents two hitching-cords, provided with ordinary snaps, a, by which they are connected to the bridle-bit. The cords A pass through loops b, projecting from the bottom side of the shafts B, and are connected at their back ends to the cords C. These cords are each connected to one of the shafts B by a spring, D, fitting over a hook, E, projecting from the shaft B, as shown. The tension of the springs D is arranged to draw on the cords C. The cords C pass around pulleys F, and both connect at their back ends with a cord, G, which is suitably supported from the reach of the vehicle, and is connected at the back end with a winding-drum, H. This drum H is loosely journaled on the shaft I, and, as may be seen in Fig. 4, has a ratchet-dog, d, pivoted in it and designed to engage with a ratchet-wheel, J, which is keyed or otherwise fastened to the shaft I. By thus forming a ratchet-connection between the drum H and the shaft I the said shaft will revolve in one direction without moving the drum; but when revolved in the other direction it will carry the drum H with it. One end of the shaft I is suspended from the reach K in a suitable bearing, while the other end is supported in a suitable bearing formed on the end of the arm L, which is pivotally connected at its end to the end of the lever M, and passes through a slot made in the L-shaped bracket N in such a manner that it may be adjusted longitudinally in the said bracket by the movement of the lever.

O represents collars fitted onto the shaft I and abutting against either side of the arm L, so as to hold the bearing in place and protect it from dust.

e represents balls fitted into an annular groove in the bearing of the arm L for the shaft I. The L-shaped bracket N extends below the axle P and is secured thereto by the clips Q. A slot is made in the L-shaped bracket N to permit the free passage of the lever M, which has an elongated slot, f, made in it, to fit over the pin R, fixed in the slot of the bracket N.

S is a friction-pulley secured to the shaft I, and designed to engage with a grooved pulley, T, fixed to the hub U. By fitting small blocks g in the slot f the position of the fulcrum of the lever M is easily altered, so as to move the pulley S nearer to or farther from the grooved pulley T. A cord, V, is connected to the lever M, and after passing around pulleys, as indicated, is carried through the body of the vehicle to a point convenient for the driver.

W is a spring-plate fixed to the reach K and provided with a projection, h, with which the end of the lever M engages when pulled back, so as to force the friction-pulley S into gear with the grooved pulley T, in which position it is shown in Fig. 1. If the vehicle was in motion, the grooved pulley T would be revolving in the direction indicated, and when the friction-pulley S was forced into contact with it the winding-drum would revolve in the direction shown by its arrow, winding up the cord G, so as to draw upon the cords C and check the horse, as desired.

When the driver wishes to release the strain on the horse, he has merely to draw upon the cord X, which is located as indicated and connected to the spring-plate W, so that the said spring-plate may be drawn upon and its projection $h$ carried away from the end of the lever N, which will spring back and carry the pulley S clear of the pulley T. With the view of keeping the cord V slack when the lever is held in the position shown in Fig. 1, I connect a spring, Y, to the cord V in such a manner as to draw upon the said cord and leave that portion of it in proximity to the lever M perfectly slack, as indicated.

It will be seen that the mechanism desricbed may be put into action when the vehicle is in motion, or it may be set so that it will act when the vehicle is moved. Consequently my device is applicable for stopping a runaway, or it may be used instead of a weight or hitching-post.

Instead of having a slot in the lever M fitting over a stationary pin, R, arranged in connection with the blocks $g$, for the purpose of adjusting the fulcrum of the lever, as described, the same effect may be obtained by making the pin adjustable, so that the position of the lever's fulcrum may be altered as desired.

What I claim as my invention is—

1. The L-shaped bracket N, secured to the axle P by the clips Q, and having a slotted passage-way made in it to receive the lever M, which is pivotally connected to the arm L, on the end of which the shaft I is journaled, in combination with a pin, R, fixed in the slot of the bracket N and passing through an elongated slot, $f$, in the lever M, in which detachable blocks $g$ are inserted for the purpose of readily altering the position of the fulcrum of the lever, substantially as and for the purpose specified.

2. The lever M, connected to the shaft I, as described, and having a cord, V, attached for the purpose of operating it, as described, in combination with a spring, Y, connected to the cord V, arranged to hold the said cord so that the portion next to the lever M will be slack when the said lever is locked to the spring-plate W, as specified.

3. The arm L, pivotally connected to the lever M, in combination with the shaft I, passing through a ball-bearing formed in the end of the arm L, and protected by the collars O, fixed to the shaft I on either side of the said bearing, substantially as and for the purpose specified.

4. The shaft I, journaled on the end of an arm pivotally connected to the lever M, in combination with an L-shaped bracket secured to the axle and carrying an adjustable fulcrum for the lever M, substantially as and for the purpose specified.

Toronto, May 31, 1888.

FRED. T. AIKINS.

In presence of—
  CHARLES C. BALDWIN,
  CHAS. H. RICHES.